July 24, 1923.

H. HIGGIN 1,462,545

WINDSHIELD ATTACHMENT FOR AUTOMOBILES

Filed Nov. 19, 1921

INVENTOR:
Henry Higgin
BY
Allen & Allen
ATTORNEYS.

Patented July 24, 1923.

1,462,545

UNITED STATES PATENT OFFICE.

HENRY HIGGIN, OF NEWPORT, KENTUCKY, ASSIGNOR TO THE HIGGIN MANUFACTURING COMPANY, OF NEWPORT, KENTUCKY, A CORPORATION OF WEST VIRGINIA.

WINDSHIELD ATTACHMENT FOR AUTOMOBILES.

Application filed November 19, 1921. Serial No. 516,298.

*To all whom it may concern:*

Be it known that I, HENRY HIGGIN, a citizen of the United States, and a resident of Newport, in the county of Campbell and State of Kentucky, have invented certain new and useful Improvements in Windshield Attachments for Automobiles, of which the following is a full, clear, and exact description, reference being had to the accompanying drawings, forming part of this specification.

The object of my invention is to provide a simple, effective and durable hinge coupling for the attachment and support of glare shields or visors in use on automobiles. These glare shields of opaque material are usually hinged to the front portion of the automobile top to serve as an overhang or extension of the top to shield the eyes of the driver from unnecessary glare.

The visors are usually supported at the sides by brackets or arms attached to the wind-shield side standards, and provision is made for adjusting and locking the supporting arms to hold the visor in any position of slant desired.

It is the object of my present invention to provide a hinge coupling for this purpose, which can be readily and easily adjusted and securely locked without liability of becoming loose and rattling under the jars to which the visor is constantly exposed and in which the side arms may be securely clamped to the side supports of the varying widths of wind-shields without the necessity of a special construction or special size or form for each design of car, whereby the attachment device may be manufactured and sold as a stock proposition for any make of car.

My invention consists, therefore, in that certain novel construction and arrangement of parts to be hereinafter particularly pointed out and claimed, in which the objects above set forth are attained.

Figure 1:
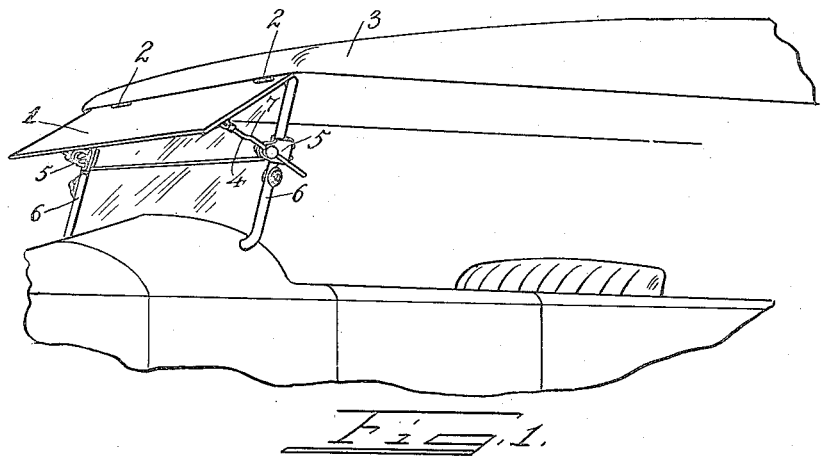
Figure 1 is a perspective view of the front portion of an automobile with my invention in use.
Figure 2:
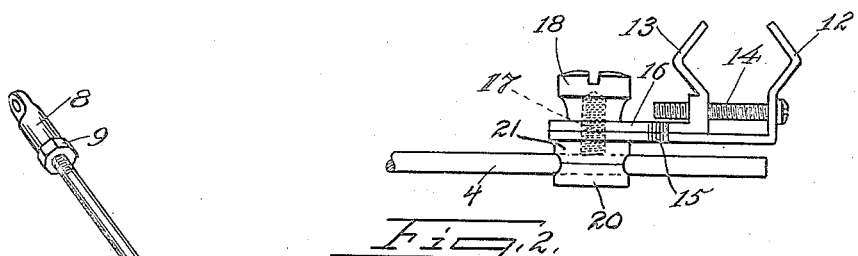
Figure 2 is a plan view of the swivel joint and clamp attachment for the wind-shield.
Figure 4:
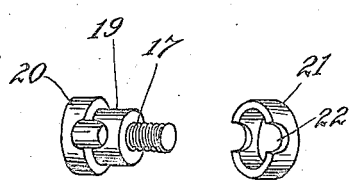
Figure 4 is a detail view of the swivel joint.
Figure 3:
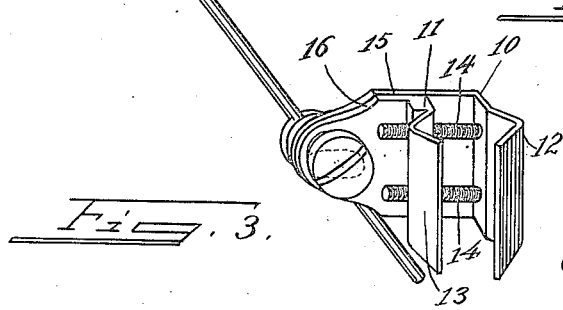
Figure 3 is a perspective view of the attachment device detached from the shield.

The glare guard 1 is shown in Figure 1 as hinged at 2, 2, to the front of the top 3 of an automobile. For supporting the guard I provide the side rods 4, 4, which are swiveled to the clamps 5, 5, for attachment to the side standards 6, 6, of the wind-shield.

In order that the clamps may be made to fit for varying widths of wind-shield I give each supporting rod a bend 7, which permits turning of the rod to bring the two clamps nearer or farther apart to accommodate them to variations in width of the windshield. The rod is hinged to the glare guard by a coupling 8, which is provided with a screwthreaded socket to receive the threaded end of the rod and a lock nut 9 is also provided to lock the rod in the desired positions. The clamp for securing the rod to the wind-shield standard on each side comprises two members 10 and 11, each formed with a suitable V-shaped or other bend 12 and 13 to embrace the shield standard. Each clamp member is provided with a flat base 15, 16 extending laterally forming a rigid support for the clamp members and they are securely clamped in engagement with the support by the screws 14.

The base plates of the clamp members are securely locked together by the swivel screw 17, which engages through registering slotted openings in the base plates, the parts being locked together by the nut 18 and the slots being provided to allow adjustment of the clamp members.

The head 19 of the swivel screw 17 is provided with a transverse circular opening of a diameter to receive the rod 4, this opening being half on the flange 20 of the head, and a separate cap 21 fits on the head 19 as a clamp washer.

This cap is provided with grooves 22 of a depth to clamp around the rod. As the nut 18 is tightened, therefore, the rod will be tightly clamped and locked to the swivel by the engagement of the grooves 22 around the rod. The screw and nut, therefore, serve both to secure together the clamp plates and to lock the rod in any desired position. Moreover, the swivel screw and its parts are of sufficient size to insure against working loose and rattling, while the mere loosening of the nut 18 allows for any desired adjustment of the angle of the visor.

Having thus described my invention, what

I claim as new and desire to secure by Letters Patent, is:—

1. In a glare guard attachment, the combination of a rod and a clamp, the clamp comprising clamp members, with means for clamping the same on a support, a bolt and nut carried by the clamp, the bolt having a transverse opening for the passage of the rod, and a clamp washer on the bolt to engage the rod to lock the same when the nut is tightened, a coupling for the rod to the glare guard to permit longitudinal rotation of the rod, with the rod provided with a longitudinal bend to permit of lateral adjustment of the clamp.

2. In a glare guard attachment, the combination of a rod and a clamp, the clamp comprising clamp members, with laterally extending flat slotted base portions, slidable on each other for adjustment of the clamp, and a nut and bolt for securing the clamp members together, the bolt having a transverse opening for the passage of the rod and a clamp washer thereon to engage the rod to lock the same when the nut is tightened, a coupling for the rod to the glare guard to permit longitudinal rotation of the rod, the rod having a longitudinal bend to permit of lateral adjustment of the clamp.

HENRY HIGGIN.